(12) United States Patent
Mistry et al.

(10) Patent No.: US 9,906,092 B2
(45) Date of Patent: Feb. 27, 2018

(54) ELECTRODYNAMIC MACHINES, AND METHOD FOR REDUCING VIBRATION OF AN ELECTRODYNAMIC MACHINE

(71) Applicant: SIEMENS INDUSTRY, INC., Alpharetta, GA (US)

(72) Inventors: Rajendra Mistry, Cincinnati, OH (US); Sumit Singhal, Mason, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 342 days.

(21) Appl. No.: 14/751,882

(22) Filed: Jun. 26, 2015

(65) Prior Publication Data
US 2016/0380505 A1    Dec. 29, 2016

(51) Int. Cl.
H02K 5/24    (2006.01)

(52) U.S. Cl.
CPC ........................................ *H02K 5/24* (2013.01)

(58) Field of Classification Search
CPC ................................................... H02K 5/24
USPC ............................................. 310/51; 318/114
See application file for complete search history.

(56) References Cited

U.S. PATENT DOCUMENTS

| 4,947,067 | A | * | 8/1990 | Habermann | ........... F16F 7/1011 244/170 |
| 5,229,670 | A | | 7/1993 | Kagawa | |
| 5,239,340 | A | | 8/1993 | Kagawa | |
| 5,397,949 | A | * | 3/1995 | Guardiani | ............. F04D 29/669 310/51 |
| 5,637,938 | A | * | 6/1997 | Vukorpa | ................. F16F 7/104 310/51 |
| 5,809,843 | A | | 9/1998 | Barger et al. | |
| 5,920,173 | A | | 7/1999 | Mercadal et al. | |
| 6,138,629 | A | * | 10/2000 | Masberg | ................. B60K 6/26 123/192.1 |
| 6,144,176 | A | | 11/2000 | Quinlan | |
| 6,259,224 | B1 | | 7/2001 | Smith et al. | |
| 6,933,629 | B2 | | 8/2005 | Qui et al. | |
| 6,936,990 | B2 | | 8/2005 | Oyama et al. | |
| 7,370,524 | B2 | | 5/2008 | Hopkins | |
| 7,768,160 | B1 | | 8/2010 | Sahyoun | |

(Continued)

FOREIGN PATENT DOCUMENTS

| CN | 102825613 A | 12/2012 |
| JP | 06328949 A | 11/1994 |

(Continued)

OTHER PUBLICATIONS

J.E. Huber, N.A. Fleck and M.F. Ashby, The selection of mechanical actuators based on performance indices, Department of Engineering, Cambridge University, 1997, Great Britain.

*Primary Examiner* — Jeremy Luks

(57) ABSTRACT

An electrodynamic machine includes a rotor assembly, a stator assembly defining an annular core receiving the rotor assembly, the rotor assembly rotating within the stator assembly based on electromagnetic fields generated by the stator assembly and the rotor assembly, a plurality of structural components mechanically supporting the rotor assembly and stator assembly, and an active damping element providing forced vibrations that counteract structural vibrations of the electrodynamic machine caused by magnetic forces based upon the electromagnetic fields or caused by mechanical forces based upon the plurality of structural components.

13 Claims, 3 Drawing Sheets

(56) References Cited

U.S. PATENT DOCUMENTS

| | | | |
|---|---|---|---|
| 2002/0121816 A1* | 9/2002 | Qiu | F04B 17/04 310/51 |
| 2008/0100156 A1* | 5/2008 | Gabsi | H02K 1/12 310/51 |
| 2013/0118210 A1 | 5/2013 | Wee et al. | |
| 2013/0307354 A1* | 11/2013 | Christen | B24B 23/04 310/50 |

FOREIGN PATENT DOCUMENTS

| | | |
|---|---|---|
| JP | 3679832 B2 | 8/2005 |
| WO | 2007147994 A1 | 12/2007 |

\* cited by examiner

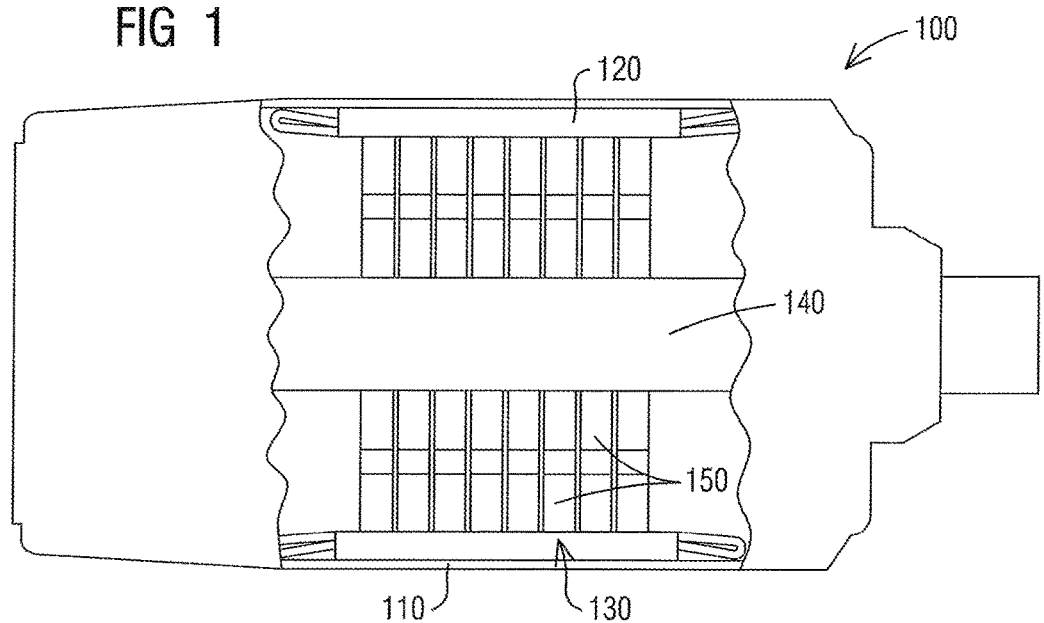
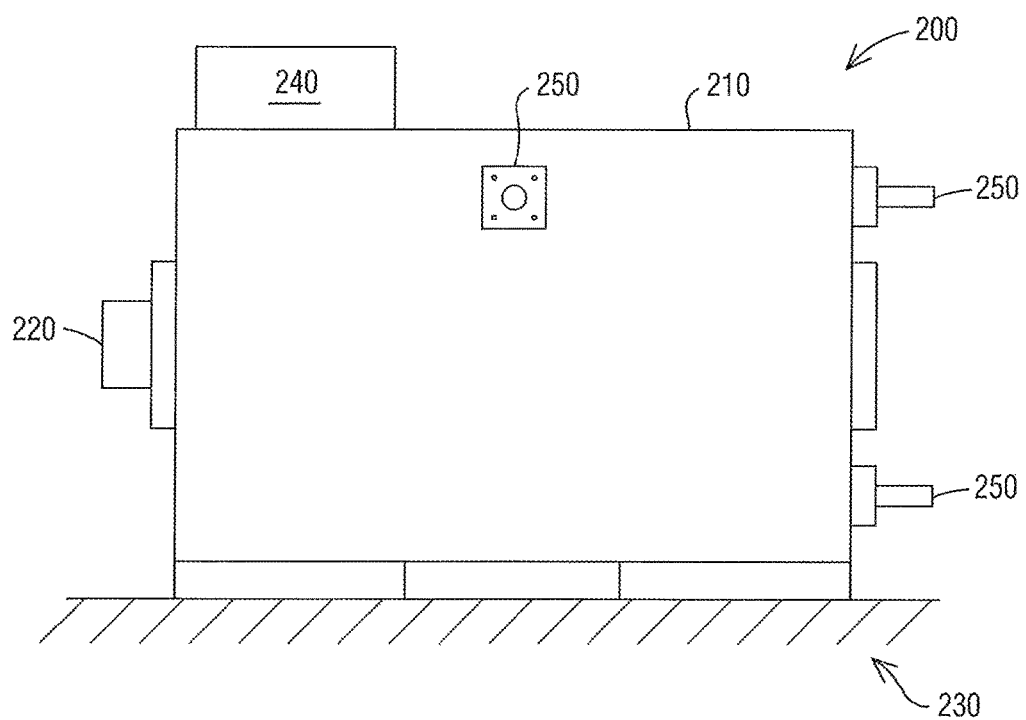

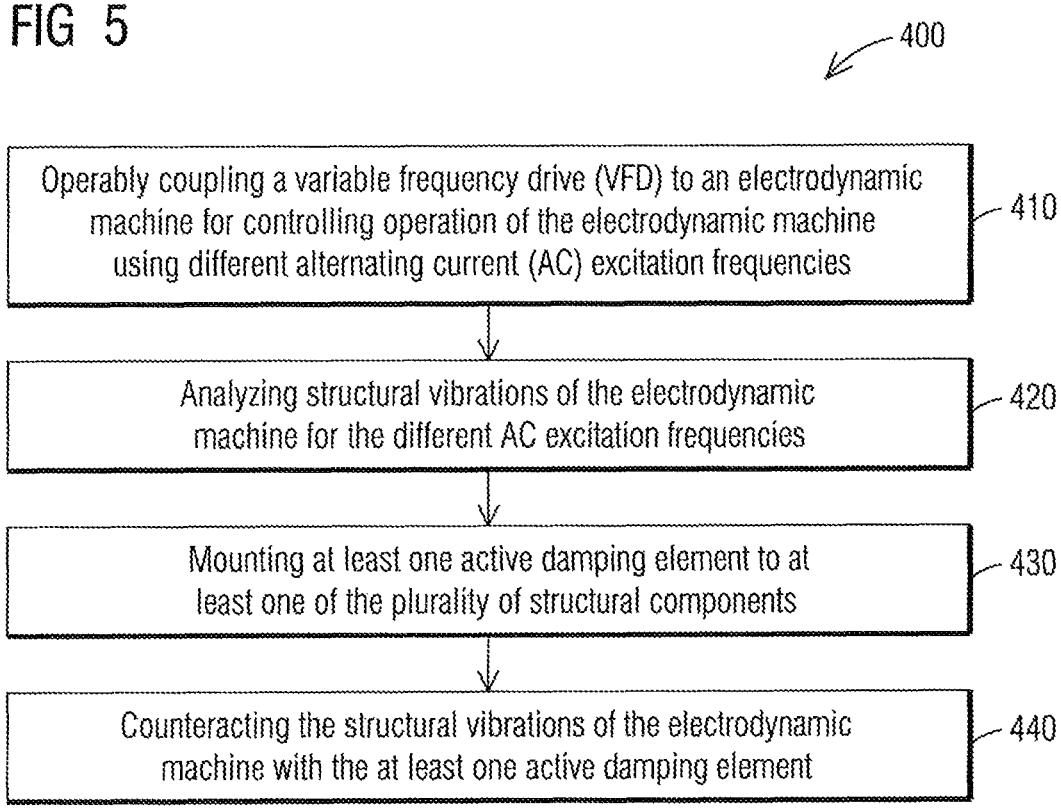

ELECTRODYNAMIC MACHINES, AND METHOD FOR REDUCING VIBRATION OF AN ELECTRODYNAMIC MACHINE

BACKGROUND

1. Field

Aspects of the present invention generally relate to electrodynamic machines, and a method for reducing vibration of an electrodynamic machine.

2. Description of the Related Art

Machines with rotating masses, including electrodynamic machines, inherently have critical vibration excitation speeds attributable to the structural mechanics of the device and associated system operational forces. For example, the structure and bearing housings of electrodynamic machines are exposed to different mechanical forces, i.e., unbalanced forces, and electromagnetic forces, i.e., generation of electromagnetic fields, which manifest as vibrations. Whenever excitation frequencies coincide with the natural frequencies of the structures, high vibration occurs. Exposure to such high vibration can damage or cause catastrophic breakdown of the machinery. Hence, high vibration is undesirable in the machinery. It is known to design structures and/or components of electrodynamic machines with low structural vibration, wherein the natural frequencies of the system and/or components are very different compared to operating frequencies and speeds.

Induction motor vibration influences that ultimately contribute to motor critical vibration speed include among other things: rotor length to diameter ratio, rotor core cross-sectional structure, shrink fit pressure between the rotor core and shaft, stacking spacing between adjoining rotor core laminas, changes in alternating current excitation frequency established by variable speed motor drive controllers, and oil whip rotor-dynamic stability induced by the hydrodynamic bearings that support the rotor shaft. With respect to excitation frequency vibration influences, induction motors generally are optimized for 50 Hz or 60 Hz alternating current excitation frequencies, including any operational vibration responses. However, AC induction motors that are coupled to variable speed motor control drives, for example a variable frequency drive (VFD), often vary the AC excitation frequencies in a range from 30 Hz to 75 Hz. This increased range of AC variable excitation frequencies increase proportionally the motor's responsive critical vibration frequency range. Thus, a need exists for an electrodynamic machine, for example an induction motor, operated with a variable frequency drive which comprises reduced structural vibrations.

SUMMARY

Briefly described, aspects of the present invention relate to electrodynamic machines, which include for example electric motors such AC asynchronous motors, for example induction motors, and AC synchronous motors, as well as electric generators, and methods for reducing vibration of electrodynamic machine.

A first aspect of the present invention provides an electrodynamic machine comprising a rotor assembly; a stator assembly defining an annular core receiving the rotor assembly, the rotor assembly rotating within the stator assembly based on electromagnetic fields generated by the stator assembly and the rotor assembly; a plurality of structural components mechanically supporting the rotor assembly and stator assembly; and at least one active damping element providing forced vibrations that counteract structural vibrations of the electrodynamic machine caused by magnetic forces based upon the electromagnetic fields or caused by mechanical forces based upon the plurality of structural components.

A second aspect of the present invention provides an electrodynamic machine comprising a rotor assembly comprising a rotor shaft; a stator assembly defining an annular core receiving the rotor assembly, the rotor assembly rotating within the stator assembly based on electromagnetic fields generated by the stator assembly and the rotor assembly, a plurality of structural components mechanically supporting the rotor and stator assemblies, and at least one damping element reducing unbalanced forces of the rotor shaft caused by magnetic forces based upon the electromagnetic fields or caused by mechanical forces based upon the plurality of structural components that support the rotor and stator assemblies.

A third aspect of the present invention provides a method for reducing vibration of an electrodynamic machine, the electrodynamic machine comprising a rotor assembly; a stator assembly defining an annular core receiving a portion of the rotor assembly; and a plurality of structural components mechanically supporting the rotor and stator assemblies, the method comprising analyzing structural vibrations of the electrodynamic machine caused by magnetic forces based upon electromagnetic fields or caused by mechanical forces based upon the plurality of structural components; and counteracting the structural vibrations of the electrodynamic machine with at least one active damping element.

BRIEF DESCRIPTION OF THE DRAWINGS

FIG. 1 illustrates schematically a cut away elevational view of a known induction motor.

FIG. 2 illustrates a side view of an electrodynamic machine, for example an induction motor, in accordance with an exemplary embodiment of the present invention.

FIG. 5 illustrates a flow chart of a method for reducing vibration of an electrodynamic machine in accordance with an exemplary embodiment of the present invention.

DETAILED DESCRIPTION

Figure 3A:
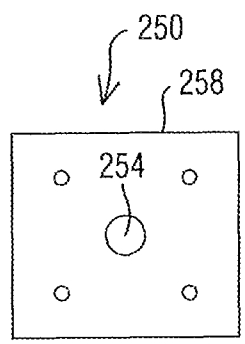
FIGS. 3A and 3B illustrate a schematic front view and side view of an active damping element for an electrodynamic machine assembly in accordance with an exemplary embodiment of the present invention.

To facilitate an understanding of embodiments, principles, and features of the present invention, they are explained hereinafter with reference to implementation in illustrative embodiments. In particular, they are described in the context of being electrodynamic machines, which include for example electric motors such AC asynchronous motors, for example induction motors, and AC synchronous motors, as well as electric generators, and methods for reducing vibration of electrodynamic machine. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

FIG. 1 shows a known electrodynamic machine induction motor 100 in partial cut away axial view. The exemplary motor 100 is a totally enclosed fan cooled alternating current motor, it being understood that the present invention may be applied to other types of electrodynamic machines and electric motors that have a rotating mass. The motor 100 has a housing 110 and a stator 120 circumferentially oriented therein. The stator 120 forms a generally annular core into which is axially inserted a rotor assembly 130, which shall hereafter generally be referred to as a rotor. The rotor 130 has a shaft 140 onto which are affixed a stack of abutting rotor laminas 150. The rotor laminas 150, which are flat sheets of insulation coated ferromagnetic metal (e.g., pressed steel), are abutted to form the rotor core. For simplicity, motor components that are not deemed necessary for one skilled in the art to make and use the present invention are not included in the figures. For example, neither the axial conductive copper or aluminum axial bars that would normally be inserted in the outer periphery slots formed in the rotor laminas nor short circuit rings normally on the respective ends of the rotor 130 are shown.

FIG. 2 illustrates a side view of an electrodynamic machine, for example an induction motor 200, in accordance with an exemplary embodiment of the present invention. The motor 200 is for example a three-phase induction motor. The induction motor 200 comprises a housing or enclosure 210, a shaft 220, and a base or foundation 230 to which the motor 200 is mounted. Other components of the motor 200 are not explicitly shown in FIG. 2, for example stator assembly, bearing housings, cooling devices, etc. One or ordinary skill in the art knows and understands components and functions of an induction motor.

Furthermore, the motor 200 comprises a variable frequency drive (VFD) 240, also referred to as adjustable speed drive (ASD), which is operably coupled to the induction motor 200 in order to control motor speed and torque by varying motor input frequency and voltage. The VFD 240 can be directly mounted on the motor 200, for example the housing 210 as illustrated in FIG. 2, or can be remotely located and operably coupled to the induction motor 200 including connecting elements, for example cables.

The induction motor 200 is exposed to different mechanical forces, i.e., unbalanced forces, and electromagnetic forces, i.e., generation of electromagnetic fields, which manifest as vibrations, also referred herein as structural vibrations. Structural vibrations of the electrodynamic machine can be caused by magnetic forces based upon electromagnetic fields, generated for example by rotor assembly and/or stator assembly of the electrodynamic machine, or caused by mechanical forces based upon a plurality of structural components. Such structural components include for example an enclosure, bearings, and bearing housings of the machine. Vibration is a mechanical phenomenon whereby oscillations occur about an equilibrium point. Whenever excitation frequencies coincide with the natural frequencies of the structures of the motor 200, high vibration occurs. Exposure to such high vibration can damage or cause catastrophic breakdown of the machine 200. Hence, high vibration is undesirable in the motor 200.

In order to reduce vibration levels of the motor 200, the motor 200 comprises at least one active damping element 250 which is configured to cancel or at least reduce vibration caused by the motor 200. Details of such an active damping element 250 are described in FIGS. 3A and 3B.

With continued reference to FIG. 2, according to an exemplary embodiment, the at least one active damping element 250 is directly mounted to the induction motor 200, for example a surface of the induction motor 200, in particular a surface of the housing 210 of the motor 200. One or more active damping elements 250 may be mounted to different structures and/or different locations of the motor 200. The embodiment according to FIG. 2 shows three active damping elements 250 mounted to the motor housing 210 at different positions or locations of the surface of the housing 210. For example, two active damping elements 250 are mounted to a front end of the motor housing 210, and one active damping element 250 is mounted at a side surface of the motor housing 210. Proper placements of the active damping elements 250 are necessary to reduce or completely remove the vibration of the motor 200. Positions of the active damping elements 250 may be determined using different methods for analyzing natural vibrations and/or frequencies of an electrodynamic machine.

Each active damping element 250 provides a counter-vibration to, i.e. counteracts, the natural frequency/vibration of the motor 200, wherein a force, i.e. magnitude, and frequency of the counter-vibration are configured so that the counter-vibration superimposes the natural vibration of the motor 200 in such a way that natural vibration and counter-vibration cancel each other. Thus, applied force and frequency of the active damping elements 250 are in opposite direction to the vibration of the motor 200.

By applying a counter-vibration in opposite direction by the at least one active damping element 250, a node or point of zero vibration is created at the position wherein the active damping element 250 is provided. The counter-vibration is an adaptive control force which changes an operational deflection shape of structures, for example the housing 210, and natural frequencies of the motor 200, hence reducing the vibration of the motor 200. For example, the VFD 240 controls operation of the induction motor 200 using different alternating current (AC) excitation frequencies, wherein the forced vibrations of the at least one active damping element 250 are adaptable to follow the different AC excitation frequencies such that the forced vibrations substantially cancel the structural vibrations of the motor 200.

Figure 3B:
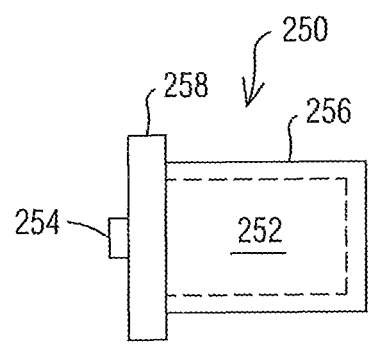

FIGS. 3A and 3B illustrate a schematic front view and side view of an active damping element 250 for an electrodynamic machine 200 in accordance with an exemplary embodiment of the present invention. According to an exemplary embodiment as illustrated in FIGS. 3A and 3B, the active damping element 250 comprises for example an electromechanical solenoid 252. Electromechanical solenoids typically comprise an electromagnetically inductive coil, wound around a movable armature. The coil is shaped such that the armature can be moved in and out of the center, altering the coil's inductance and thereby becoming an electromagnet. The active damping element 250 further comprises a vibrating stem 254 (acting as the armature), comprising for example metal, passing through the solenoid 252. When energized, the solenoid 252 pulls on the stem 254 via its magnetic field. The vibrating stem 254 provides a mechanical force to structures of the motor 200, for example the motor housing 210, in order to cancel natural frequencies/vibrations of the motor 200. The active damping element 250 can further comprise an enclosure 256 and a mounting flange 258 for mounting the element 250 to the motor 200.

The electromechanical solenoid 252 may be controlled directly by a controller circuit, and thus has very quick reaction times. For example, the forcing frequency and the magnitude of the force of the active damping element 250, in particular the solenoid 252, can be adjusted, for example by a control unit of the motor 200. The control unit can be integrated into the VSD 240 or can be a separate motor control unit. For example, for different alternating current excitation frequencies, for example 60 Hz or 70 Hz, the natural vibrations/frequencies (vibration) of the induction motor 200 are determined. Based on the determined natural frequencies, the forced frequencies ("counter-vibration") with which the active damping element 250 is to be operated can be determined. The determined natural frequencies and forced frequencies, wherein the forced frequencies are substantially in opposite direction of the natural frequencies, along with control parameters can be stored in the control unit so that the control unit can control the active damping element 250 accordingly. As noted before, different methods for analyzing natural vibrations and/or frequencies of an electrodynamic machine may be used and are known to one of ordinary skill in the art.

Figure 4:
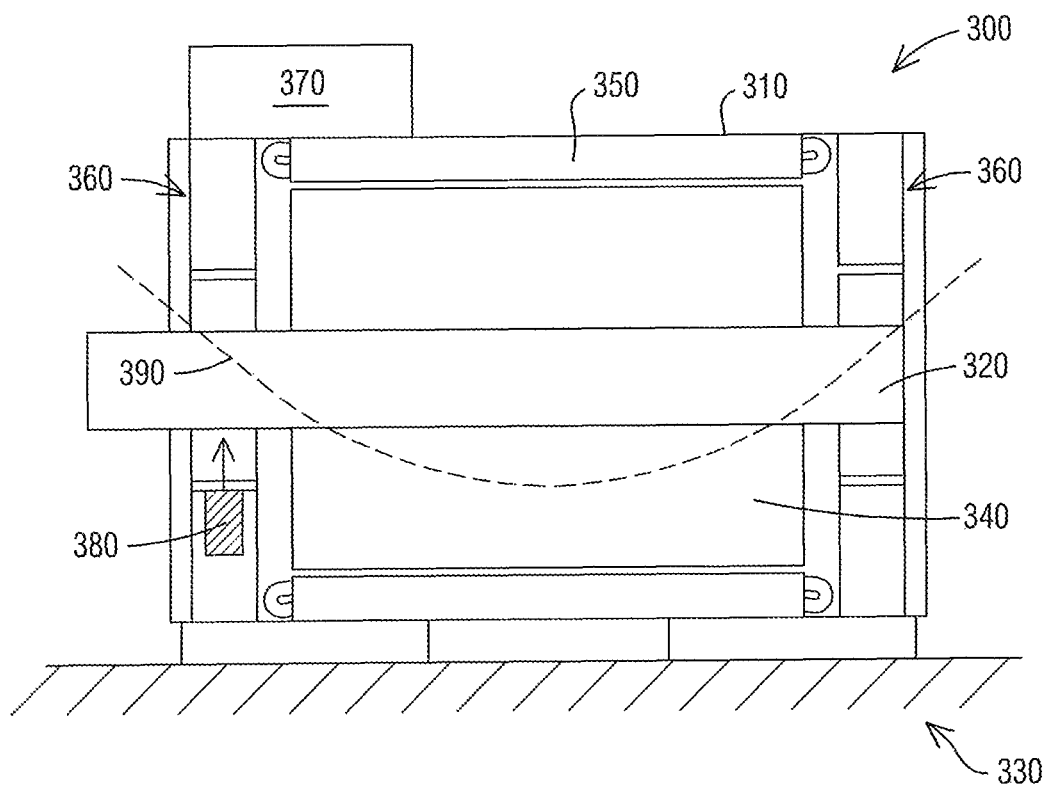
FIG. 4 illustrates a schematic side view of an electrodynamic machine, for example an induction motor, in accordance with an exemplary embodiment of the present invention.

FIG. 4 illustrates a schematic side view of an electrodynamic machine, for example an induction motor 300, in accordance with a further exemplary embodiment of the present invention. The induction motor 300 comprises a housing or enclosure 310, a shaft 320, and a base or foundation 330 to which the induction motor 300 is mounted. Furthermore, the induction motor 300 comprises a rotor assembly 340, stator assembly 350, and bearings 360, which are for example magnetic bearings.

Furthermore, the induction motor 300 can comprise a VFD 370 in order to control motor speed and torque by varying motor input frequency and voltage. The motor 300 is for example a three-phase induction motor. The VFD 370 can be directly mounted on the motor 300, as illustrated in FIG. 4, or can be remotely located and operably coupled to the motor 300 via cables. Other components of the induction motor 300 not deemed necessary for one of ordinary skill in the art to understand the present invention are not explicitly shown in FIG. 4, for example cooling devices, etc.

In order to reduce vibration levels of the induction motor 300, in particular to reduce unbalanced forces of the rotor shaft 320 of the rotor assembly 340, as indicated with line 390, the motor 300 comprises at least one damping element 380. The at least one damping element 380 reduces unbalanced forces of the rotor shaft 320 caused by magnetic forces based upon the electromagnetic fields or caused by mechanical forces based upon the plurality of structural components, which are for example the enclosure 310 or the bearings 360.

The at least one damping element 380 is a stationary device and can be integrated into the motor 300, for example into one or more of the bearings 360 or into the stator assembly 350. FIG. 4 shows the at least one damping element 380 integrated into one of the magnetic bearings 360. The at least one damping element 380 can comprise for example an electromagnet controllable by a control unit. The control unit controlling the damping element 380 can be integrated into the VSD 370 or can be a separate control unit. Furthermore, in order to control the at least one damping element 380 including the electromagnet, the induction motor 300 can comprise one or more sensors for determining an actual position of the shaft 320 of the rotor assembly 340. For example, since the damping element 380 is integrated into the bearing 360, the sensor may also be integrated into the bearing 360 in order to properly determine the position of the shaft 320. Signals of the sensors are transmitted to the control unit, which is for example the VSD 370, which then can calculate an actuating variable to control the damping element 380 in order to provide a force which counteracts the unbalanced forces (see line 390) of the shaft 320 of the rotor assembly 340. As noted before, the VFD 370 is operably coupled to the electrodynamic machine 300 for controlling operation of the electrodynamic machine using different alternating current (AC) excitation frequencies. According to an exemplary embodiment, the at least one damping element 380 is configured such that the unbalanced forces of the rotor shaft 320 are reduced according to the different AC excitation frequencies of the VFD 370.

According to a further embodiment of the present invention, an electrodynamic machine, for example the induction motor 200 and/or induction motor 300, can comprise one or more of the active damping elements 250, as described for example in FIG. 2 and FIGS. 3A and 3B, and/or one or more of the damping elements 380, as described for example in FIG. 4.

FIG. 5 illustrates a flow chart of a method 400 for reducing vibration of an electrodynamic machine in accordance with an exemplary embodiment of the present invention. Reference is made to the elements and features described in FIGS. 1-4. The electrodynamic machine, for example induction motor 200, 300, comprises a rotor assembly 340 and a stator assembly 350, the stator assembly 350 defining an annular core receiving a portion of the rotor assembly 340, and a plurality of structural components mechanically supporting the rotor assembly 340 and stator assembly 350.

Step 410 comprises operably coupling a variable frequency drive 240, 370 to the motor 200, 300 for controlling operation of the motor 200, 300 using different alternating current (AC) excitation frequencies. Step 410 is an optional step, i.e. the induction motor may not comprise a variable frequency drive. Step 420 comprises analyzing, for example measuring, structural vibrations of the motor 200, 300 for the different AC excitation frequencies. In step 430, at least one active damping element 250 is mounted to at least one of the plurality of structural components. Step 440 comprises counteracting the structural vibrations of the induction motor 200, 300 with the at least one active damping element 250.

The at least one active damping element 250 is positioned such that a node or point of zero vibration is created at a position of the active damping element 250. An amplitude and frequency of the forced vibrations of the at least one active damping element 250 are configured such that the forced vibrations substantially cancel the structural vibrations of the motor 200, 300. The forced vibrations of the at least one active damping element 250 are adaptable to follow the different AC excitation frequencies such that the forced vibrations substantially cancel the structural vibrations of the motor 200, 300. It should be appreciated that some steps are not required to be performed in any particular order, or are optional, for example step 410 may be optional, i.e., the motor 200, 300 may not comprise a VFD 240, 370.

Another strategy to control vibration of the structure, for example of the induction motor 200, is to apply at least one active damping element 250 configured as an actuator, for example as an electromechanical solenoid as described before, to generate a frequency and force ("counter-vibration") which is applied out of phase with the actual deflection (natural frequency/vibration) of the motor 200. Amplitude and location/position of the control force, i.e. the active damping element 250, can be changed to suppress vibration of structures of the motor 200. Such an actuator can be used at a single location or multiple locations depending upon the operating deflection shape of the structure of the motor 200.

By using the proposed damping elements 250, 380 for electrodynamic machines as described herein, the amplitude of the vibration of an electrodynamic machine can be reduced at desired frequency, or can be adapted to follow a changing natural frequency for wide speed ranges of the machine, thus minimizing the vibratory force or displacement of structures of the machine. Also, the damping elements 250, 380 may also be applied to reduce vibration levels of the machine structures when the complete machine is mounted on a foundation which is typically influencing the vibration of machine structure, for example an inadequate foundation of the electrodynamic machine may lead to high transmissibility of the vibration of the machine.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. An electrodynamic machine comprising:
   a rotor assembly;
   a stator assembly defining an annular core receiving the rotor assembly, the rotor assembly rotating within the stator assembly based on electromagnetic fields generated by the stator assembly and the rotor assembly;
   a plurality of structural components mechanically supporting the rotor assembly and stator assembly; and
   at least one active damping element providing forced vibrations that counteract structural vibrations of the electrodynamic machine caused by magnetic forces based upon the electromagnetic fields or caused by mechanical forces based upon the plurality of structural components, and a variable frequency drive operably coupled to the electrodynamic machine for controlling operation of the electrodynamic machine using different alternating current (AC) excitation frequencies, wherein the forced vibrations of the at least one active damping element are adaptable to follow the different AC excitation frequencies such that the forced vibrations substantially cancel the structural vibrations of the electrodynamic machine.

2. The electrodynamic machine of claim 1, wherein the at least one active damping element is positioned such that a node or point of zero vibration is created at a position of the active damping element.

3. The electrodynamic machine of claim 1, wherein the plurality of structural elements comprises an enclosure, the rotor assembly and stator assembly being positioned within the enclosure, wherein the at least one active damping element is mounted to a surface of the enclosure.

4. The electrodynamic machine of claim 1, wherein an amplitude and frequency of the forced vibrations of the at least one active damping element are configured such that the forced vibrations substantially cancel the structural vibrations of the electrodynamic machine.

5. The electrodynamic machine of claim 1, wherein the at least one active damping element comprises an electromechanical solenoid and a vibrating stem passing through the electromechanical solenoid, wherein the vibrating stem provides the forced vibrations.

6. The electrodynamic machine of claim 5, wherein the at least one active damping element further comprises an enclosure and a mounting flange for mounting the at least one active damping element to at least one of the plurality of structural components.

7. The electrodynamic machine of claim 1, wherein the at least one active damping element is controlled by a controller circuit incorporated into the variable frequency drive.

8. The electrodynamic machine of claim 1, wherein the plurality of structural components comprises an enclosure, bearings, and bearing housings.

9. A method for reducing vibration of an electrodynamic machine, the electrodynamic machine comprising a rotor assembly; a stator assembly defining an annular core receiving a portion of the rotor assembly; and a plurality of structural components mechanically supporting the rotor and stator assemblies, the method comprising:
   analyzing structural vibrations of the electrodynamic machine caused by magnetic forces based upon electromagnetic fields or caused by mechanical forces based upon the plurality of structural components; and
   counteracting the structural vibrations of the electrodynamic machine with at least one active damping element, and operably coupling a variable frequency drive to the electrodynamic machine for controlling operation of the electrodynamic machine using different alternating current (AC) excitation frequencies, wherein forced vibrations of the at least one active damping element are adaptable to follow the different AC excitation frequencies such that the forced vibrations substantially cancel the structural vibrations of the electrodynamic machine.

10. The method of claim 9, further comprising:
    mounting the at least one active damping element to at least one of the plurality of structural components, wherein the at least one active damping element is positioned such that a node or point of zero vibration is created at a position of the active damping element.

11. The method of claim 9, wherein an amplitude and frequency of forced vibrations of the at least one active damping element are configured such that the forced vibrations substantially cancel the structural vibrations of the electrodynamic machine.

12. The method of claim 9, wherein the at least one active damping element comprises an electromechanical solenoid and a vibrating stem passing through the electromechanical solenoid.

13. The method of claim 12, wherein the at least one active damping element further comprises an enclosure and a mounting flange for mounting the at least one active damping element to at least one of the plurality of structural components.

* * * * *